3,072,646
NOVEL 6-CHLORO-17α-HALOETHYNYL-19-NOR-
ANDROSTADIENES AND PROCESSES
John Fried, Plainfield, and Thomas S. Bry, Roselle, N.J.,
assignors to Merck & Co., Inc., Rahway, N.J., a corporation of New Jersey
No Drawing. Filed Mar. 2, 1961, Ser. No. 88,575
9 Claims. (Cl. 260—239.55)

This invention is concerned generally with novel steroid compounds and processes of preparing the same. More particularly, it relates to a novel process for preparing 21-halonorethisterones, and the $\Delta^{5(10)}$-isomers thereof, starting with 3-methoxy-2,5(10)-androstadiene-17-one, and to closely related compounds.

The compounds prepared by our invention possess useful therapeutic properties as orally and parenterally active progestational agents.

According to the process of our invention, the starting material utilized is the 3-methoxy-2,5(10)-androstadiene-17-one which has the following structural formula:

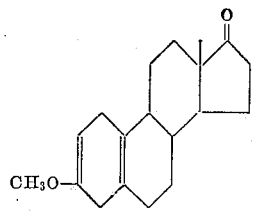

It has been found that the above starting material will react with a haloethyne to form the corresponding 17α-haloethynyl-3-methoxy-2,5(10)-androstadiene-17β-ol, which has the following structure:

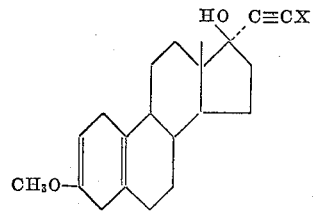

wherein X stands for chloro, bromo or fluoro.

In a preferred embodiment of our inventon, the haloethyne is formed in situ by the reaction of a 1,2-dihaloethylene (preferably the cis form) and methyl lithium. For example, the 17α-chloroethynyl-3-methoxy 2,5(10)-androstadiene-17β-ol is prepared by adding a solution of cis-1,2-dichloroethylene in ether to a solution of methyl lithium at about 0° C. in ether. The reaction mixture is stirred under nitrogen for 1–2 hours, 3-methoxy-2,5(10)-androstadiene-17-one is added, and stirring is continued for several hours longer.

The 17α-haloethynyl-3-methoxy-2,5(10)-androstadiene-17β-ol is converted into the 17α-haloethynyl-17β-hydroxy-19-nor-4-androstene-3-one (i.e. the 21-halonorethisterone) which has the following formula:

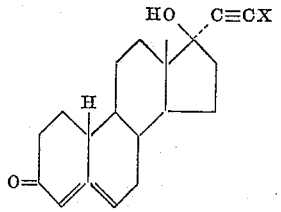

wherein X stands for chloro, bromo or fluoro, by reaction with a strong mineral acid, such as p-toluenesulfonic acid. For example, a mixture of the steroid and p-toluenesulfonic acid in acetone solution is left standing at room temperature overnight.

The 17α-haloethynyl-17β-hydroxy-19-nor-4-androstene-3-ones are converted into the 3-enol ethers (i.e. the 3-alkoxy-17α-haloethynyl-19-nor-3,5-androstadiene-17β-ols) which have the following formula:

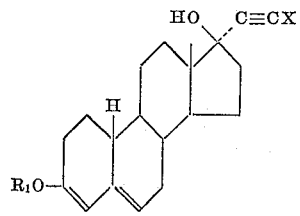

wherein X stands for chloro, bromo or fluoro, and $R_1$ is an alkyl group, by stirring together a mixture of the steroid and an alkyl orthoformate in dioxane solution in the presence of a strong acid catalyst, for example, a mineral acid, or an organic sulfonic acid.

In a preferred embodiment of our invention, the novel 3-enol ethyl ethers of the 17α-haloethynyl-17β-hydroxy-19-nor-4-androstene-3-ones are prepared by adding ethyl orthoformate and p-toluenesulfonic acid to a solution of the steroid in dioxane and stirring together at room temperature. The acid catalyst is then neutralized with a base such as pyridine. The 3-enol n-butyl ethers of the 17α-haloethynyl-17β-hydroxy-19-nor-4-androstene-3-ones are prepared by stirring together a mixture of the steroid and n-butyl orthoformate with 2,4-dinitrobenzenesulfonic acid in dioxane solution overnight at about 30° C. The acid catalyst is then neutralized with a base such as pyridine.

The 6-chloro-17α-haloethynyl-17β-hydroxy-19-nor-4,6-androstadiene-3-one is prepared from the 3-enol ethyl ether of the 17α-haloethynyl-17β-hydroxy-19-nor-4-androstene-3-one by reaction first with N-bromosuccinimide to give 6β-bromo-17α-haloethynyl-17β-hydroxy-19-nor-4-androstene-3-one which has the following formula:

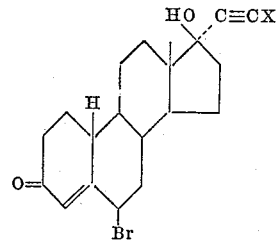

wherein X is chloro, bromo or fluoro. In a preferred embodiment of our invention, a solution of the steroid and sodium acetate in aqueous acetone is stirred with N-bromosuccinimide and acetic acid at about 0° C.

The 6-bromo-derivative is then dehydrogenated at $\Delta^6$ to form the 17α-haloethynyl-17β-hydroxy-19-nor-4,6-androstadiene-3-one which has the structure:

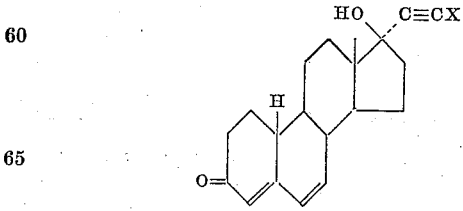

wherein X is chloro, bromo or fluoro. The dehydrogenation is brought about by heating a solution of the steroid in a solvent such as dimethylformamide with lithium bromide and lithium carbonate for several hours at about 120° C.

The above compound is then oxidized to the 6α,7α-epoxy - 17α - haloethynyl - 17β - hydroxy-19-nor-4-androstene-3-one which has the following structure:

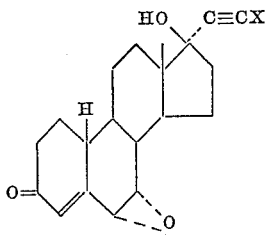

wherein X is chloro, bromo or fluoro, suitably by treating a solution of the steroid in a solvent such as benzene with perbenzoic acid in the dark at room temperature for about 60–70 hours.

A solution of the 6α,7α-epoxy-17α-haloethynyl-17β-hydroxy-19-nor-4-androstene-3-one in an organic solvent is treated with HCl at room temperature to form the 6-chloro-17α-haloethynyl-17β-hydroxy-19 - nor - 4,6 - androstadiene-3-one which has the following formula:

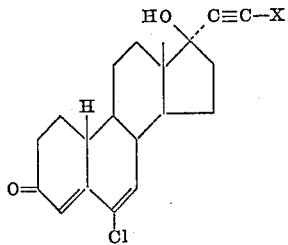

wherein X is chloro, bromo or fluoro.

17α-haloethynyl-3-methoxy-2,5(10)-androstadiene-17β-ol is converted into 17α-haloethynyl-17β-hydroxy-5(10)-androstene-3-one (21-halo-Enovid) which has the following formula:

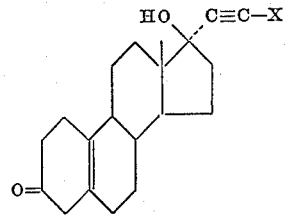

wherein X stands for chloro, bromo or fluoro, by reaction with a weak organic acid such as acetic acid. For example, a mixture of the steroid and glacial acetic acid in an aqueous solution of absolute ethanol and dioxane is left standing at room temperature for several hours.

The 17α-haloethynyl-17β-hydroxy-4,9-androstadiene-3-one which has the following formula:

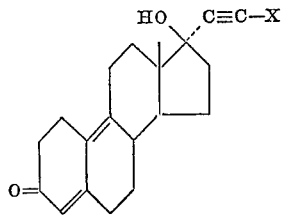

wherein R stands for chloro, bromo or fluoro, is prepared by treatment of 17α-haloethynyl-17β-hydroxy-5(10)-androstene-3-one with approximately one equivalent of bromine in pyridine solution, or with pyridine perbromide hydrobromide.

The following examples illustrate methods of carrying out the present invention, but it is to be understood that these examples are given for purposes of illustration and not of limitation.

*Example 1*

A solution consisting of 1.7 g. (1.32 cc.) of cis-1,2-dichloroethylene in 10 cc. of sodium dried ether is added over 0.5 hour at 0° C. to 3 cc. of a 1.4 N solution of methyl lithium (prepared by adding lithium to methyl iodide in dry ether solution under nitrogen at about 10° C.) in 25 cc. of sodium dried ether. The reaction mixture is stirred at room temperature under nitrogen for an additional 1½ hours, followed by the addition, over a 15-minute period, of 100 mg. of 3-methoxy-2,5(10)-androstadiene-17-one in 4 cc. of sodium dried ether. The mixture is left stirring at room temperature overnight, poured into ice water and extracted with ether. The ether extracts are washed with water, dried over sodium sulfate and concentrated in vacuo. The residue is chromatographed on 10 g. of basic alumina. The product is eluted with petroleum ether:ether 8:2. Crystallization from acid-free methanol affords 48 mg. of 17α-chloroethynyl-3-methoxy-2,5(10)-androstadene - 17β - ol, M.P. 112–115° C.

I.R. $\lambda_{max.}^{Nujol}$ 2.80, 4.48, 6.02, 6.12μ

*Analysis.*—Calculated for $C_{21}H_{27}O_2Cl$: C, 72.71; H, 7.85. Found: C, 72.85; H, 8.13.

$\lambda_{dioxane}^{D26°C.}$ +68.6, c.=1

In accordance with the above procedures, but using 1,2-dibromoethylene in place of 1,2-dichloroethylene, there is obtained the 17α-bromoethynyl-3-methoxy-2,5(10)-androstadiene-17β-ol.

In accordance with the above procedure, but using 1-chloro-2-fluoroethylene in place of 1,2-dichloroethylene, there is obtained a mixture of the 17α-chloroethynyl- and the 17α-fluoroethynyl-3-methoxy-2,5(10)-androstadiene-17β-ol, which compounds are separated by chromotography.

*Example 2*

A solution consisting of 10 mg. of 17α-chloroethynyl-3-methoxy-2,5(10)-androstadiene-17β-ol, 2 cc. of acetone and 2 mg. of p-toluenesulfonic acid is left standing at room temperature overnight. The reaction mixture is then poured into ice water and extracted with ether. The ether extract is washed with aqueous sodium bicarbonate solution, dried over sodium sulfate and concentrated in vacuo. Crystallization from ethyl acetate affords 17α-chloroethynyl-17β-hydroxy-19-nor-4-androstene - 3 - one, M.P. 185–190°.

I.R. $\lambda_{max.}^{Nujol}$ 2.95, 4.50, 6.10, 6.21μ

In accordance with the above procedure, but starting with the 17α-bromoethynyl- or 17α-fluoroethynyl-3-methoxy-2,5(10)-androstadiene-17β-ol in place of the 17α-chloroethynyl - 3 - methoxy - 2,5(10)-androstadiene-17β-ol there is obtained as products the corresponding 17α-bromoethynyl- or 17α-fluoroethynyl-17β-hydroxy-19-nor-4-androstene-3-one.

*Example 3*

To a solution of 100 mg. of 17α-chloroethynyl-17β-hydroxy-19-nor-4-androstene-3-one in 3 cc. of dioxane is added 2 cc. of ethyl orthoformate and 10 mg. of p-toluene-sulfonic acid. The reaction mixture is stirred at room temperature for 3 hours and 1 cc. of pyridine is added, followed by the dropwise addition of 5 cc. of water. The aqueous phase is separated and extracted with benzene. The organic extracts are washed with a sodium bicarbonate solution and then with water until the washings are neutral. The organic phase is dried over sodium sulfate and concentrated in vacuo to give 3-ethoxy-17α-chloroethynyl-19-nor-3,5-androstadiene - 17β-ol.

I.R. $\lambda_{max.}^{Neat}$ 2.86, 4.50, 6.05, 6.15μ

In accordance with the above procedure, but starting with the 17α-bromoethynyl- or the 17α-fluoroethynyl-17β-hydroxy-19-nor-4-androstene-3-one in place of the 17α-chloroethynyl-17β-hydroxy-19-nor-4-androstene - 3 - one there are obtained as products the corresponding 17α- bromoethynyl- or the 17α-fluoroethynyl-3-ethoxy-3,5-androstadiene-17β-ol.

*Example 4*

A mixture of 100 mg. of 17α-chloroethynyl-17β-hydroxy-19-nor-4-androstene-3-one, 0.06 g. of 2,4-dinitrobenzenesulfonic acid, 3 ml. of dry dioxane and 0.25 ml. of freshly distilled n-butyl orthoformate are stirred overnight at 30° C. The acid catalyst is then neutralized by addition of 0.1 ml. of pyridine. The reaction mixture is diluted with water and extracted with ether. The combined ether extracts are washed with water, dried and evaporated under reduced pressure. The residue is chromatographed over alumina (alkaline) and eluted with mixtures of ether and petroleum ether to separate 3-butoxy-17α-chloroethynyl-19-nor-3,5-androstadiene-17β-ol.

In accordance with the above procedure, but starting with the 17α-bromoethynyl- or the 17α-fluoroethynyl-17β-hydroxy-19-nor-4-androstene-3-one in place of the 17α-chloroethynyl-17β-hydroxy-19-nor-4-androstene-3-one there are obtained as products the corresponding 17α-bromoethynyl- or the 17α-fluoroethynyl-3-butoxy-19-nor-3,5-androstadiene-17β-ol.

*Example 5*

A solution consisting of 1 g. of 3-ethoxy-17α-chloroethynyl-19-nor-3,5-androstadiene-17β-ol, 700 mg. of sodium acetate, 5 ml. of water and 40 ml. of acetone is cooled to 0° C. and 1.07 g. of N bromosuccinimide and 0.83 ml. of acetic acid is added. The mixture is stirred for 3 hours at 0.5° C. and then poured into water to yield the 6β-bromo-17α-chloroethynyl-17β-hydroxy-19-nor-4-androstene-3-one.

Treatment of 6β-bromo-17α-chloroethynyl-17β-hydroxy-19-nor-4-androstene-3-one (1.0 g.) with 1.0 g. of lithium bromide, 500 mg. of lithium carbonate and 20 ml. of dimethylformamide for 5 hours at 120° C., followed by dilution with ice water and filtration affords 17α-chloroethynyl-17β-hydroxy-19-nor-4,6-androstadiene-3-one.

A solution consisting of 675 mg. of 17α-chloroethynyl-17β-hydroxy-19-nor-4,6-androstadiene-3-one, 30 ml. of 0.2 N perbenzoic acid dissolved in benzene, and 30 ml. of ether is allowed to stand at room temperature in the dark for 68 hours. The product is washed with acidified sodium bisulfite solution, water, 2.5 N potassium hydroxide solution and water. The material is dried and concentrated in vacuo. The crude 6α,7α-epoxy-17α-chloroethynyl-17β-hydroxy-19-nor-4-androstene-3-one is used directly in the next step.

The 6α,7α-epoxy-17α-chloroethynyl-17β-hydroxy-19-nor-4-androstene-3-one dissolved in 20 ml. of 0.4 N hydrochloric acid in chloroform, is allowed to stand for 5.5 hours at room temperature, and then subsequently poured into iced sodium bicarbonate solution. The product is extracted with chloroform, dried, and concentrated in vacuo. Chromatography on acid-washed alumina (20 g.) and elution with ether-petroleum ether mixtures affords the 6-chloro-17α-chloroethynyl-17β-hydroxy-19-nor-4,6-androstadiene-3-one.

In accordance with the above procedures, but starting with the 3-ethoxy-17α-bromoethynyl- (or the 17α-fluoroethynyl)-19-nor-3,5-androstadiene-17β-ol in place of the 3-ethoxy-17α-chloroethynyl-19-nor-3,5-androstadiene-17β-ol there are obtained as products the corresponding 6-chloro-17α-bromoethynyl- (or the 17α-fluoroethynyl)-17β-hydroxy-19-nor-4,6-androstadiene-3-one.

*Example 6*

To a solution of 160 mg. of 17α-chloroethynyl-3-methoxy-2,5(10)-androstadiene-17β-ol in 1.6 cc. of dioxane and 7.2 cc. of absolute ethanol is added 3.2 cc. of glacial acetic acid, and immediately thereafter, 1.6 cc. of water. This reaction mixture is left standing at room temperature for 5 hours. It is then poured into an ice/sodium bicarbonate solution, allowed to stand until the mixture is basic and extracted with benzene. The benzene extracts are washed with water until the washings are only slightly basic and then dried over anhydrous potassium carbonate, filtered and concentrated in vacuo using a water bath at 30–50° C. By crystallization from ether, about 90 mg. of 17α-chloroethynyl-17β-hydroxy-5(10)-androstene-3-one is obtained. U.V. no max.;

I.R. $\lambda_{max.}^{Nujol}$ 2.98, 4.50, 5.90μ

In accordance with the above procedures, but starting with the 17α-bromoethynyl- or the 17α-fluoroethynyl-3-methoxy-2,5(10)-androstadiene-17β-ol in place of the 17α-chloroethynyl-3-methoxy-2,5(10)-androstadiene-17β-ol there are obtained as products the corresponding 17α-bromoethynyl- or 17α-chloroethynyl-17β-hydroxy-5(10)-androstene-3-one.

*Example 7*

To 100 mg. of 17α-chloroethynyl-17β-hydroxy-5(10)-androstene-3-one in 5 cc. of pyridine is added one equivalent of bromine. The reaction is stirred for two hours at room temperature, poured into ice-water and extracted with ether. The ether extract is washed with water, dried over sodium sulfate, and concentrated in vacuo to yield 17α-chloroethynyl-17β-hydroxy-4,9-androstadiene-3-one.

In accordance with the above procedures, but starting with the 17α-bromoethynyl- or the 17α-fluoroethynyl-17β-hydroxy-5(10)-androstene-3-one in place of the 17α-chloroethynyl-17β-hydroxy-5(10)-androstene-3-one there are obtained as products the corresponding 17α-bromoethynyl- or the 17α-fluoroethynyl-17β-hydroxy-4,9-androstadiene-3-one.

Various changes and modifications may be made in carrying out the present invention without departing from the spirit and scope thereof. Insofar as these changes and modifications are within the purview of the annexed claims, they are to be considered as part of our invention.

We claim:

1. 17α-haloethynyl-17β-hydroxy-19-nor-4,6-androstadiene-3-one.

2. 6α,7α-epoxy-17α-haloethynyl-17β-hydroxy-19-nor-4-androstene-3-one.

3. 6-chloro-17α-haloethynyl-17β-hydroxy-19-nor-4,6-androstadiene-3-one.

4. 6-chloro-17α-chloroethynyl-17β-hydroxy-19-nor-4,6-androstadiene-3-one.

5. Process for the preparation of 6β-bromo-17α-haloethynyl-17β-hydroxy-19-nor-4-androstene-3-one which comprises reacting a solution of 3-ethoxy-17α-haloethynyl-19-nor-3,5-androstadiene-17β-ol in an organic solvent with N-bromosuccinimide in the presence of acetic acid and sodium acetate.

6. Process for the preparation of 17α-haloethynyl-17β-hydroxy-19-nor-4,6-androstadiene-3-one which comprises heating a solution of 6β-bromo-17α-haloethynyl-17β-hydroxy-19-nor-4-androstene-3-one in an organic solvent with lithium bromide and lithium carbonate.

7. Process for the preparation of 5,6-epoxy-17α-haloethynyl-17β-hydroxy-19-nor-4-androstene-3-one which comprises oxidizing 17α-haloethynyl-17β-hydroxy-19-nor-4,6-androstadiene-3-one with perbenzoic acid.

8. Process for the preparation of 6-chloro-17α-haloethynyl-17β-hydroxy-19-nor-4,6-androstadiene-3-one which comprises treating a solution of 6α,7α-epoxy-17α-haloethynyl-17β-hydroxy-19-nor-4-androstene-3-one with hydrogen chloride.

9. Process for the preparation of 17α-haloethynyl-17β-hydroxy-5(10)-androstene-3-one which comprises reacting 17α-haloethynyl-3-methoxy-2,5(10)-androstadiene-17β-ol with acetic acid.

No references cited.